(12) United States Patent
Kulakowski et al.

(10) Patent No.: US 6,418,535 B1
(45) Date of Patent: Jul. 9, 2002

(54) BI-LEVEL POWER SAVER METHOD FOR PORTABLE OR LAPTOP COMPUTER

(75) Inventors: John Edward Kulakowski; Rodney Jerome Means; Daniel James Winarski, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/301,290

(22) Filed: Apr. 28, 1999

(51) Int. Cl.[7] .................................................. G06F 1/32
(52) U.S. Cl. ...................................... 713/320; 713/340
(58) Field of Search ................................ 713/300, 320, 713/310, 323, 324, 340, 502, 601

(56) References Cited

U.S. PATENT DOCUMENTS

| | | | |
|---|---|---|---|
| 5,493,670 A | | 2/1996 | Douglis et al. |
| 5,652,891 A | | 7/1997 | Kitamura et al. |
| 5,694,926 A | * | 12/1997 | DeVries et al. ......... 128/205.24 |
| 5,745,375 A | | 4/1998 | Reinhardt et al. |
| 5,752,046 A | | 5/1998 | Oprescu et al. |
| 5,754,870 A | | 5/1998 | Pollard et al. |
| 5,868,133 A | * | 2/1999 | DeVries et al. ......... 128/204.21 |
| 5,996,084 A | * | 11/1999 | Watts ......................... 713/323 |
| 6,000,035 A | * | 12/1999 | Matsushima et al. ....... 713/320 |
| 6,266,776 B1 | * | 7/2001 | Sakai ......................... 713/300 |
| 6,272,642 B2 | * | 8/2001 | Pole, II et al. .............. 713/300 |

FOREIGN PATENT DOCUMENTS

JP     04274489 A  *  9/1992  ............ G10H/1/00

* cited by examiner

Primary Examiner—Xuan M. Thai
(74) Attorney, Agent, or Firm—Douglas R. Millett; Bracewell & Patterson, L.L.P.

(57) ABSTRACT

A bi-level power saving method for a computer having one level of power saving operations that is executed when the computer is operating on an external power source and another level of power saving operations that is executed when the computer is operating on an internal power source. The method determines whether the computer is operating on an external power source or an internal power source. No preferences for tasks or devices are designated if the computer is operating on an external power source and activity and application have been detected. Various power consuming operations are executed if the computer is operating on an external power source and activity is detected but an application is not detected. The computer powers down devices if the computer is operating on an external power source and no activity is detected. Power saving operations are executed if the computer is operating on an internal power source and activity and application have been detected. Power consuming operations are inhibited if the computer is operating on an internal power source and activity is detected but application is not detected. The operator may override or choose the inhibiting/executing of the power consuming operations.

16 Claims, 4 Drawing Sheets

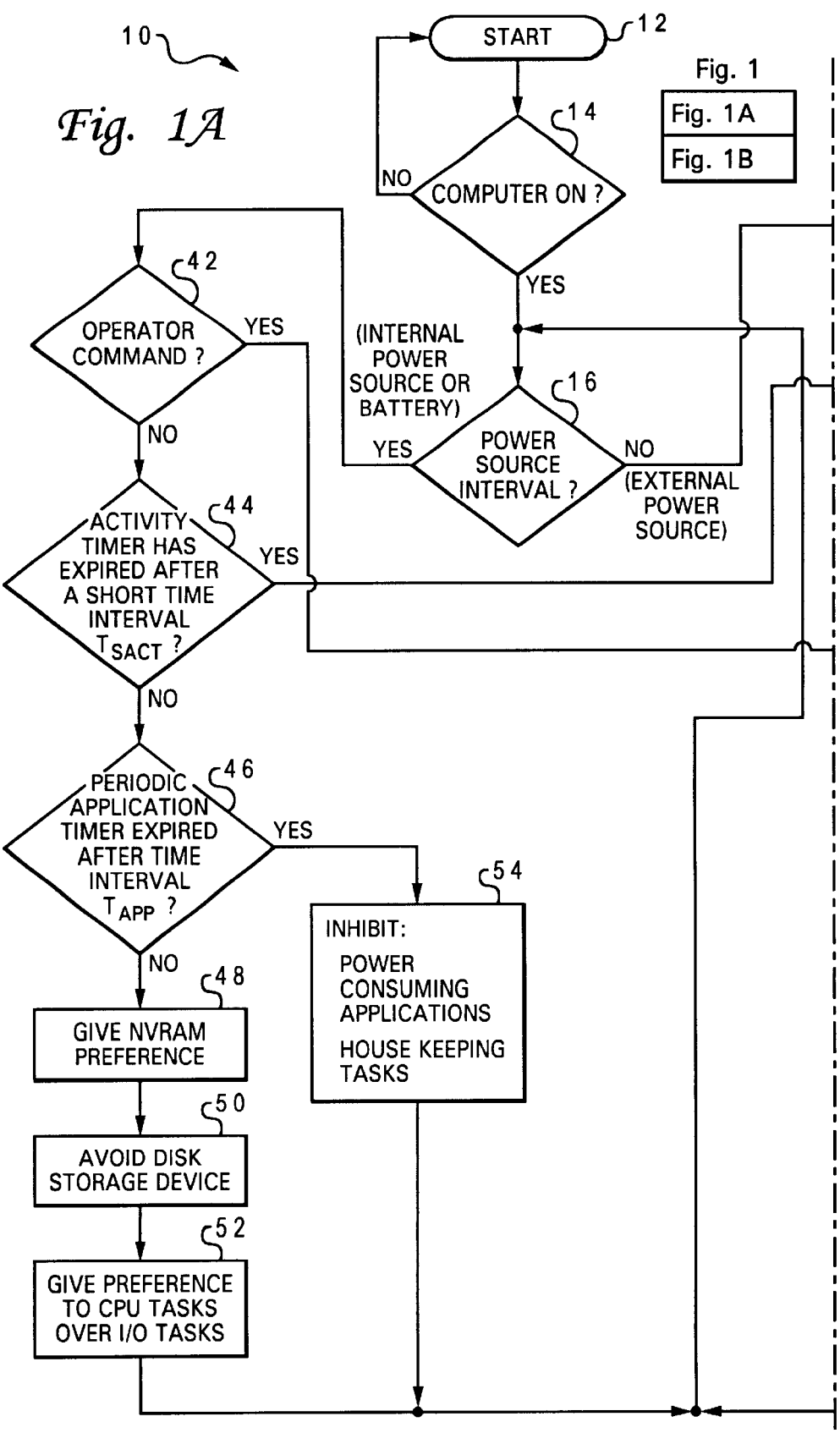

BI-LEVEL POWER SAVER METHOD FOR PORTABLE OR LAPTOP COMPUTER

BACKGROUND OF THE INVENTION

1. Technical Field

The present invention relates in general to a power saver method for a computer and in particular to a bi-level power saver method for a portable or laptop computer. Still more particularly, the present invention relates to a bi-level power saving method for a computer having one level of power saving operations that is executed when the computer is operating on an external power source and another level of power saving operations that is executed when the computer is operating on an internal power source.

2. Description of the Related Art

Power saving or power consumption reducing algorithms are highly desired for many reasons. Various algorithms have been developed to reduce the consumption of power by a computer. These algorithms may involve, for example, stopping spindle motor or shutting down the display.

Prior art methods for differentiating between power source types (i.e. external or internal power source) of a computer have been developed. U.S. Pat. No. 5,652,891 to Kitamura et al. ("Kitamura") discloses an example of such a differentiating method. Kitamura teaches a method of determining whether a power save command has been executed and, if so, whether the computer is operating from an external power source or an internal power source. If the computer is operating from an internal power source, then the computer executes the power save process in accordance with the power save command. If the computer is operating from an external power source, then the computer inhibits execution of the power save process. Therefore, this prior art method is limited in that the power save process or power down mode is executed only when the computer is operating on an internal power source. Kitamura is incorporated by reference herein.

It would therefore be advantageous and desirable to have a bi-level power saving method for a computer wherein one level of power saving operations is executed when the computer is operating on an external power source and another level of power saving operations is executed when the computer is operating on an internal power source. It would be desirable (A) to execute house keeping or cleaning operations such as the erasing of free space on various MO media, the defragmenting of disk drives, or the invoking of scandisk procedures for disk drives, when the computer is generally operating on (B) an external power source. It would further be desirable to (C) inhibit such house keeping or cleaning operations and to (D) perform power saving optimization algorithms such as inhibiting browser "push" operations, inhibiting disk save operations, turning off spindle motor, turning off display, using NV RAM in place of disk storage, using least power consuming storage devices, giving preferences to CPU tasks over input/output (I/O) tasks, when the (E) computer is generally operating on an internal power source.

SUMMARY OF THE INVENTION

It is therefore one object of the present invention to optimize saving of power and power consumption of a computer, particularly a portable or laptop computer.

It is another object of the present invention to optimize saving of power and power consumption based on determination of type of power on which the computer is operating.

It is yet another object to provide a bi-level power saving method or algorithm for a computer, particularly a portable or laptop computer.

It is another object of the present invention to provide one level of power saving for a computer when the computer is operating on an internal power source.

It is another object of the present invention to provide another level of power saving for a computer when the computer is operating on an external power source.

The foregoing objects are achieved as is now described. A bi-level power saving method for a computer having one level of power saving operations that is executed when the computer is operating on an external power source and another level of power saving operations that is executed when the computer is operating on an internal power source. The method determines whether the computer is operating on an external power source or an internal power source. No preferences for tasks or devices are designated if the computer is operating on an external power source and activity and application have been detected. Various power consuming operations are executed if the computer is operating on an external power source and activity is detected but an application is not detected. The computer powers down devices if the computer is operating on an external power source and no activity is detected. Power saving operations are executed if the computer is operating on an internal power source and activity and application have been detected. Power consuming operations are inhibited if the computer is operating on an internal power source and activity is detected but application is not detected. The operator may override or choose the inhibition/execution of the power consuming operations.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1B:
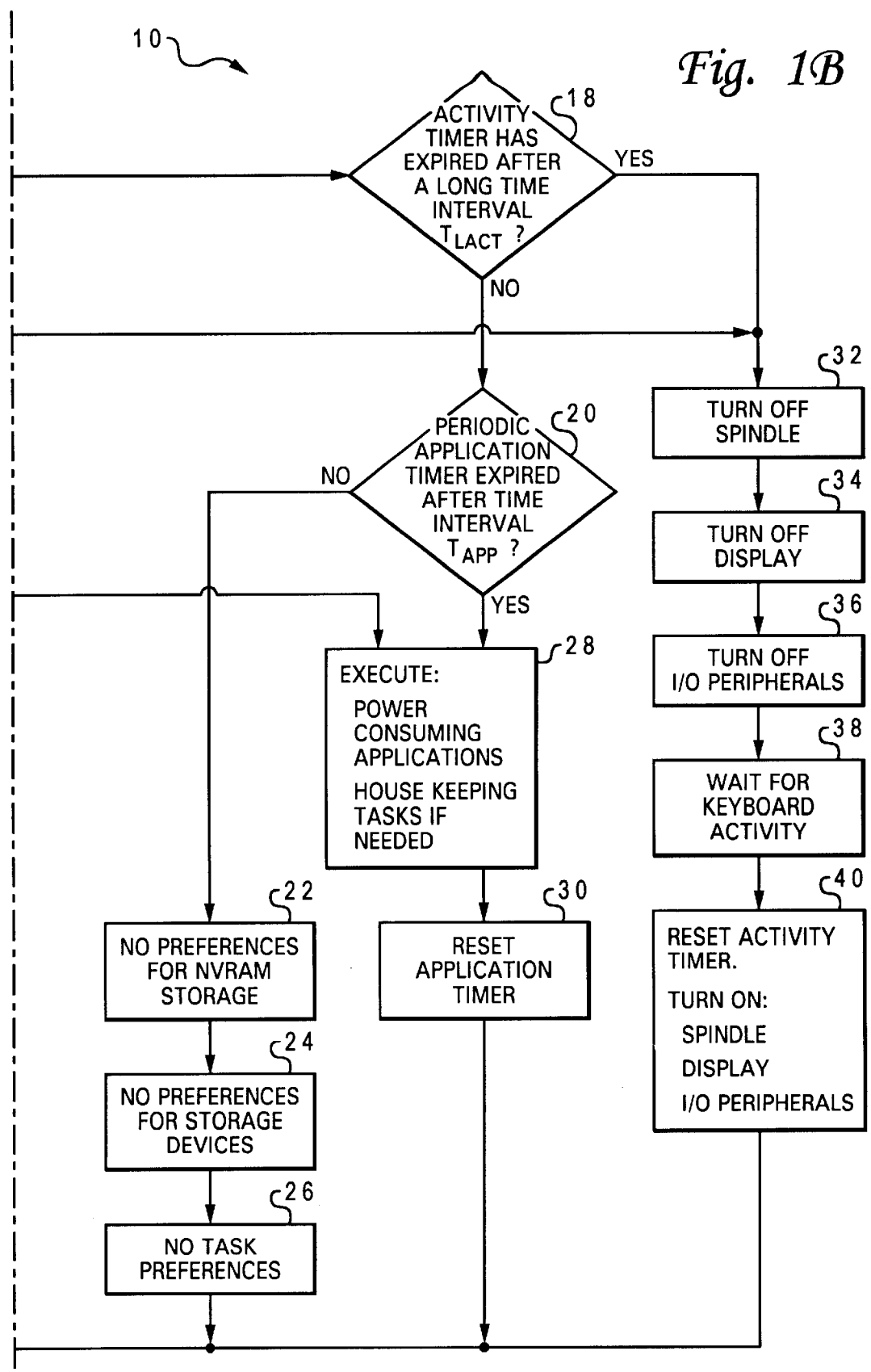
FIG. 1 is a flow chart diagram illustrating the bi-level power saver method or algorithm for a computer.

With reference now to the figures and in particular with reference to FIG. 1, a bi-level power saver method or algorithm 10 for a computer, particularly a portable or laptop computer, is shown. The method or algorithm 10 starts at block 12. The method 10 determines whether the computer system 88 (shown in block form in FIG. 5) is "on" at decision block 14. If the computer 88 is not "on", then the method 10 loops back to the start block 12 to continue to sense and determine when the computer 88 is "on". If the computer 88 is "on", then the method 10 continues to decision block 16 where the method 10 determines whether the computer 88 is operating on an internal power source or an external power source.

If the computer 88 is operating on an internal power source or battery, then the method 10 moves to decision block 42 and the blocks following thereafter. These blocks will be discussed later in more detail. However, if the computer 88 is not operating on an internal power source and is operating on an external power source or AC outlet or charging circuit 101, then the method 10 moves to decision block 18. At block 18, the method 10 determines whether the activity timer has expired after a long time interval $T_{LACT}$, that is, whether or not any activity of computer 88 at all has occurred within a predetermined time interval $T_{LACT}$.

If the activity timer has expired at decision block 18 after a time interval $T_{LACT}$, that is, activity has not been detected, then the method 10 moves to blocks 32 to 40, and these blocks will be discussed later in more detail. On the other hand, if the activity timer has not expired at decision block 18 after a time interval $T_{LACT}$, that is, activity has been detected, then the method 10 moves to decision block 20. At decision block 20, the method 10 determines whether a periodic application timer has expired after a time interval $T_{AAP}$, that is, whether or not any application of computer 88 is to be executed or has been executed in a predetermined time interval $T_{APP}$.

If the periodic application timer has not expired after a time interval $T_{APP}$, that is, application is not to be executed, then the method 10 moves to block 22 where the method 10 makes no preference for NV RAM storage and to block 24 where the method 10 makes no preferences for storage devices and to block 26 where the method 10 makes no task preferences. The method 10 loops back to decision block 16 in determining whether the computer 88 is operating on an internal power source or an external power source. If the periodic application timer has expired after a time interval $T_{APP}$, that is, application has not been executed, then the method 10 instead moves to block 28 where various tasks and/or operations are executed as programmed or as needed. At block 28, these various tasks and/or operations include but are not limited to browser "push" tasks, virus check operations, save tasks, scan disk operations, housekeeping operations, and any other desired or needed task and/or operation. The method 10 moves to block 30 where the application timer is reset, and the method 10 loops back to decision block 16 in determining whether the computer 88 is operating on an internal power source or an external power source.

As mentioned earlier, if the activity timer has expired at decision block 18 after a time interval $T_{LACT}$, then the method 10 moves to a "power down" mode, that is, to power down some of its inactive components or devices. The method 10 moves to block 32 where the spindle motor of disk drives are turned off. The method 10 further moves to block 34 where the display is turned off and to block 36 where the inactive input/output (I/O) peripherals are turned off. At block 38, the method 10 waits for keyboard activity. After the method 10 receives keyboard activity, the method 10 resets the activity timer and turns on the spindle, display, and input/output (I/O) peripherals at block 40, and the method 10 loops back to decision block 16 in determining whether the computer 88 is operating on an internal power source or an external power source.

As also mentioned earlier, if the computer 88 is operating on an internal power source or battery, then the method 10 moves to decision block 42 to determine whether an operator control command of tasks and/or operations has occurred, that is, operator is manually controlling command of the execution of the tasks and/or operations. If such an operator control command has occurred at decision block 42, then the method 10 is directed to and moves to block 28 where various tasks and/or operations are executed and to block 30 where the application timer is reset and loops back to decision block 16. If such an operator control command has not occurred at decision block 42, then the method 10 moves to decision block 44.

At block 44, the method 10 determines whether the activity timer has expired after a short time interval $T_{SACT}$, that is, whether or not any activity of computer 88 has occurred within a predetermined time interval $T_{SACT}$. If the activity timer has expired after such a time interval $T_{SACT}$, that is, activity has not been detected, then the method 10 moves to "power down" various inactive components or devices at blocks 32 to 40, that is, turn off spindle motor, display, and inactive I/O peripherals at blocks 32, 34, and 36, wait for keyboard activity at block 38, and reset the activity timer and turns on the spindle, display, and input/output (I/O) peripherals at block 40. The method 10 then loops back to decision block 16. On the other hand, if the activity timer has not expired after such a time interval $T_{SACT}$, that is, activity has been detected, then the method 10 moves to decision block 46.

Figure 2:
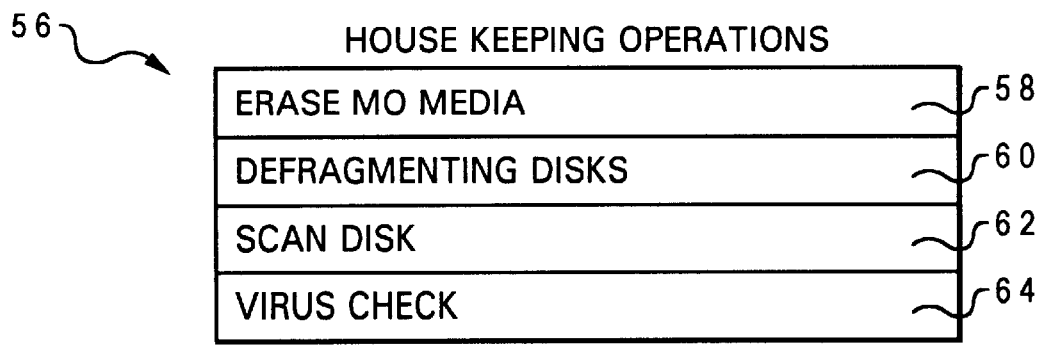
FIG. 2 is a block diagram illustrating house keeping or cleaning operations for saving computer power.

At decision block 46, the method 10 determines whether the application timer has expired after a time interval $T_{APP}$, that is, whether or not the periodic application of computer 88 has been executed or running within a predetermined time interval $T_{APP}$. If the periodic application timer has not expired after a time interval $T_{APP}$, that is, the periodic application has been executed, then the method 10 moves to blocks 48, 50, and 52. At block 48, NV RAM storage is given preference. At block 50, disk storage device is avoided, and, at block 52, CPU tasks are given preference over input/output (I/O) tasks. The method 10 then loops back to decision block 16 in determining whether the computer 88 is operating on an internal power source or an external power source. On the other hand, if the periodic application timer has expired after a time interval $T_{APP}$, that is, the periodic application has not been detected, then various tasks and/or operations are inhibited at block 54. Such tasks and/or operations that are inhibited include but are not limited to power consuming tasks, FIG. 4, and house keeping tasks. FIG. 2. The method 10 then loops back to decision block 16 in determining whether the computer 88 is operating on an internal power source or an external power source.

The method 10 of FIG. 1 referenced house keeping or cleaning operations that are performed when it has been determined that the computer 88 is operating on an external power source and when activity is still occurring but periodic applications have not been executed or run for a time period as shown from block 20 of FIG. 1. These house keeping or cleaning operations may also still be performed or executed when the computer 88 is operating on an internal power source by having the operator command them to be performed or executed (i.e. manual override by operator to perform tasks or operations) as shown from block 42 of FIG. 1.

As shown in FIG. 2, specific examples of such house keeping operations are provided. Block 56 encompasses the house keeping operation blocks 58, 60, 62, and 64. The house keeping operations include but are not limited to the following tasks: 1) erase free space on magneto-optical (MO) media or disks to facilitate 2-pass writing over 3-pass writing as shown in block 58; 2) defragmenting disk drives, such as hard disk drives, floppy disk drives, ZIP drives, RAM optical disks, or optical/DVD disk drives, in order to minimize the number of seeks under future internal power source operations, as shown in block 60; 3) invoking scan-disk procedures for any of the disk drives as shown in block 62; and 4) performing virus check operations as shown in block 64. Many other types of house keeping operations exist and may be executed by method 10.

Figure 3:
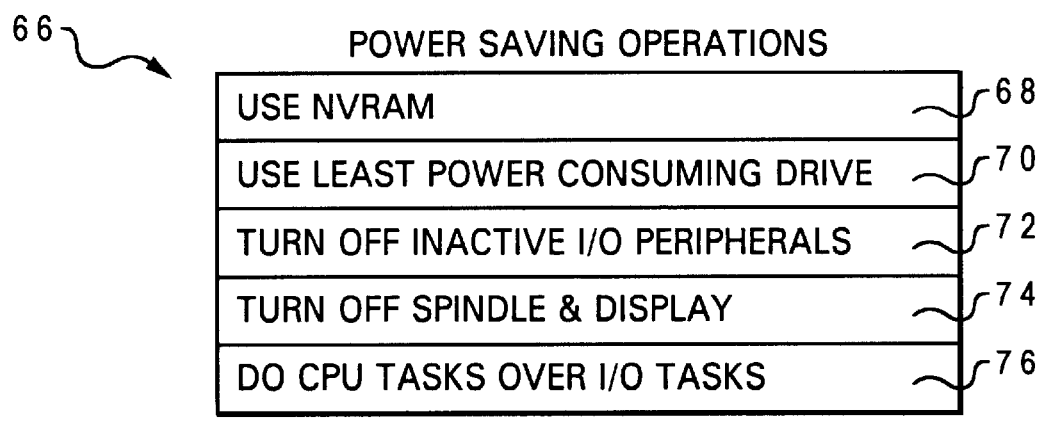
FIG. 3 is a block diagram illustrating computer power saving operations.

The method 10 of FIG. 1 also referenced performance of power saving operations when it has been determined that the computer 88 is operating on an internal power source and when execution of applications are still detected. Such power saving operations were shown in blocks 48, 50, and 52 of FIG. 1. FIG. 3 shows specific examples of such power saving operations. Block 66 encompasses the power saving operation blocks 68, 70, 72, 74, and 76. The power saving operations include but are not limited to tasks such as maximizing use of NV RAM to store information as shown in block 68, maximizing use of the least power consuming disk drives for writing data as shown in block 70, turning off inactive input/output (I/O) peripherals as shown in block 72, turning off drive spindle motor and display as shown in block 74, and performing CPU tasks over I/O tasks as shown in block 76. Alternatively, storage device selection may be implemented for managing power consumption wherein use of a storage device (optical storage devices versus floppy storage devices) is selected based on monitoring power levels of a battery or internal power source, that is, optical storage devices are used when a large remaining battery or internal power level or reserve exists and floppy storage devices are used when a small remaining battery or internal power level or reserve exists. Many other types of power saving operations exist and may be executed by method 10.

Figure 4:
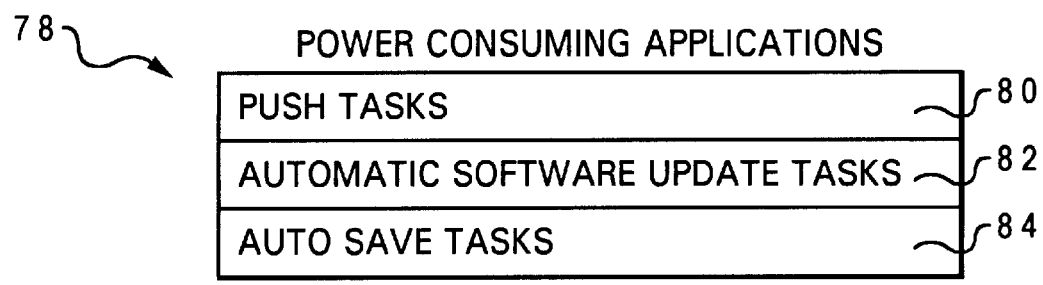
FIG. 4 is a block diagram illustrating power consuming applications that are inhibited at the appropriate time by the bi-level power saver method or algorithm.

The method 10 of FIG. 1 also referenced performance of operations that are inhibited when it has been determined that the computer 88 is operating on an internal power source and when performance of activity is still detected but execution of application is not detected. Such inhibited operations were shown in block 54 of FIG. 1. FIGS. 2 and 4 show specific examples of such inhibited operations. Block 78 encompasses the power consuming applications, blocks 80, 82, and 84. The they include but are not limited to tasks such as push tasks as shown in block 80, automatic software update tasks as shown in block 82, and auto save tasks as shown in block 84. Many other types of operations may be inhibited by method 10.

Figure 5:
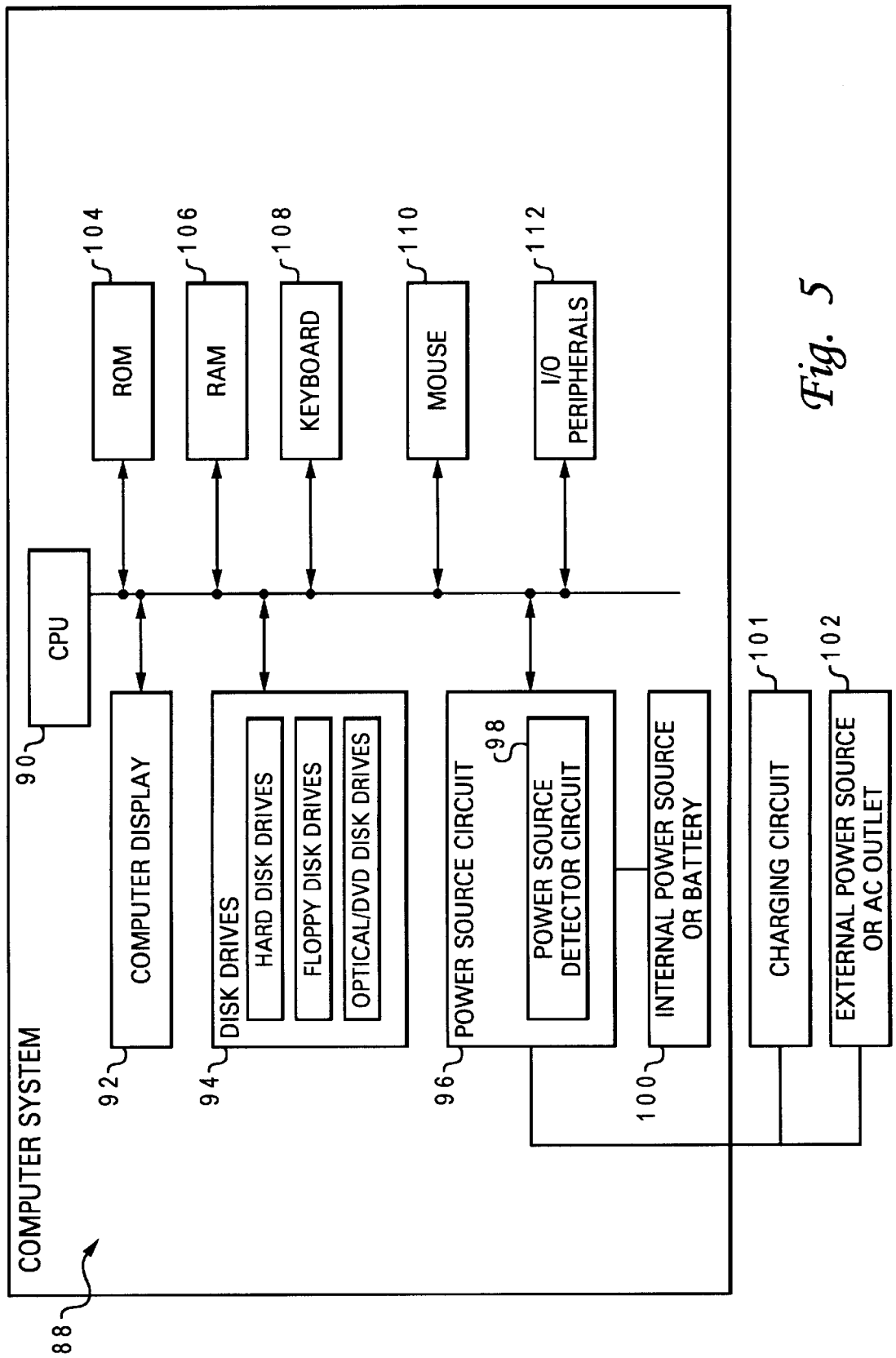
FIG. 5 is a block diagram illustrating a computer system for implementing the bi-level power saver method or algorithm.

FIG. 5 shows the computer system 88 that implements the bi-level power saver method 10. The computer system 88 has a central processing unit (CPU) 90. Various devices and circuits, such as a computer display 92, disk drives 94, a power source circuit 96, read only memory (ROM) 104, random access memory 106, a keyboard 108, a mouse 110, and other input/output (I/O) peripherals 112, are coupled to the CPU 90. The power source circuit 96 has a power source detector circuit 98. The power source circuit 96 is coupled to an internal power source or battery 100 and/or an external power source or AC outlet or charging circuit N 102. If both the internal power source 100 and the external power source 102 are coupled to the power source circuit 96 or TP adapter, then the power source circuit 96 is configured such that the external power source 102 overrides the internal power source 100 as the power source.

When the power source detector circuit 98 detects and determines that the computer 88 is operating from an external power source or AC outlet 102, then the method 10 executes and performs the operations for saving power as previously discussed. On the other hand, when the power source detector circuit 98 detects and determines that the computer 88 is operating from an internal power source or battery 100 wherein the power source is limited and precious, then the method 10 avoids the power consuming operations consuming and performs power saving optimization tasks as previously discussed.

While the invention has been particularly shown and described with reference to a preferred embodiment, it will be understood by those skilled in the art that various changes in form and detail may be made therein without departing from the spirit and scope of the invention.

What is claimed is:

1. A bi-level power saver method for a computer comprising the steps of:

detecting the computer when it is activated, determining a type of power source on which the activated computer is operating, executing one level of power saving operations when the computer is determined to be operating on an external power source, including the steps of:

detecting whether an activity of the computer is occurring;

powering down devices of the computer if the activity has not been detected;

determining whether an application is being executed by the computer if the activity has been detected;

executing various power consuming tasks and operations if the application is being executed; and executing various tasks and using devices without preference and restriction if the application is not being executed;

executing another level of power saving operations when the computer is determined to be operating on an internal power source, including the steps of:

detecting whether an activity of the computer is occurring;

powering down devices of the computer if the activity has not been detected;

determining whether an application is being executed by the computer if the activity has been detected;

executing various power saving operations if the application is being executed; and inhibiting various power consuming tasks and using devices if the application is not being executed.

2. The bi-level power saver method according to claim 1 wherein the detecting whether an activity step further comprises the step of:

using an activity timer and.determining whether the activity timer has expired.

3. The bi-level power saver method according to claim 1 wherein the determining whether an application step further comprises the step of:

using an application timer and determining whether the application timer has expired.

4. The bi-level power saver method according to claim 1 wherein the powering down step further comprises the steps of:

turning off a spindle motor of a disk drive of the computer, turning off a display of the computer, and turning off an input/output peripheral of the computer.

5. The bi-level power saver method according to claim 4 further comprising the steps of:

waiting for detected activity from a keyboard of the computer, repeating the method steps by starting with the determining a power source step when the activity from the keyboard has been detected.

6. The bi-level power saver method according to claim 1 wherein the executing various power consuming tasks and operations step further comprises the step of:

performing push tasks, virus checking operations, save tasks, scan disk operations, house keeping tasks, or any needed tasks that would consume battery power if the computer is later operated from the internal power source, thereby increasing performance and power savings of the computer during periods of battery powered operation.

7. The bi-level power saver method according to claim 1 wherein the step of executing various tasks and using devices without preference and restriction further comprises the steps of:

using NV RAM storage without preference and restriction, using storage devices without preference and restriction, and assigning no task preferences.

8. The bi-level power saver method according to claim 1 wherein the detecting whether an activity step further comprises the step of:

using an activity timer and determining whether the activity timer has expired.

9. The bi-level power saver method according to claim 1 wherein the determining whether an application step further comprises the step of:

using an application timer and determining whether the application timer has expired.

10. The bi-level power saver method according to claim 1 wherein the powering down step further comprises the steps of:

turning off a spindle motor of a disk drive of the computer, turning off a display of the computer, and turning off an input/output peripheral of the computer.

11. The bi-level power saver method according to claim 10 further comprising the steps of:

waiting for detected activity from a keyboard of the computer, and repeating the method steps by starting with the determining a power source step when the activity from the keyboard has been detected.

12. The bi-level power saver method according to claim 1 wherein the step of inhibiting various power consuming tasks and operations further comprises the step of:

inhibiting push tasks, virus checking operations, save tasks, scan disk operations, and house keeping tasks that would consume power during periods where the computer is operating on an internal power source.

13. The bi-level power saver method according to claim 1 wherein the step of executing various power saving operations further comprises the steps of:

providing preferences for NV RAM storage, avoiding disk storage devices, and providing preferences to computer processing tasks over input/output tasks.

14. The bi-level power saver method according to claim 1 further comprising the steps of:

manually overriding the inhibiting of the various power consuming tasks, and executing the various power consuming tasks.

15. The bi-level power saver method according to claim 1 wherein the method is a continuous method in that the method steps are repeated.

16. A bi-level power saver computer apparatus comprising:

a power source type detector for detecting a type of power source on which a computer is operating, and a computer processing unit and computer memory coupled to the power source type detector wherein the computer processing unit executes one level of power saving operations that is stored in the computer memory when the computer is determined to be operating on an external power source, wherein the one level of power saving operations includes:

detecting whether an activity of the computer is occurring;

powering down devices of the computer if the activity has not been detected;

determining whether an application is being executed by the computer if the activity has been detected;

executing various power consuming tasks that would consume battery power if the computer is later operated from the internal power source, thereby increasing performance and power savings of the computer during periods of battery powered operation and operations if the application is being executed; and executing various tasks and using devices without preference and restriction if the application is not being executed, and wherein the computer processing unit executes another level of power saving operations that is stored in the computer memory when the computer is determined to be operating on an internal power source:

wherein the another level of power saving operations includes:

detecting whether an activity of the computer is occurring;

powering down devices of the computer if the activity has not been detected;

determining whether an application is being executed by the computer if the activity has been detected;

executing various power saving operations if the application is being executed;

and inhibiting various power consuming tasks and using devices if the application is not being executed.

* * * * *